DISTILLATION OF HYDROGEN PEROXIDE
Filed Aug. 4, 1961
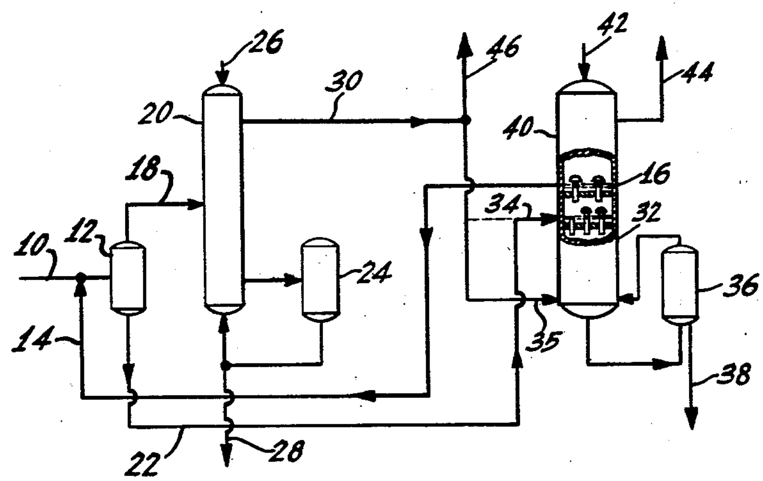
INVENTORS
THEODORE M. JENNEY,
DONALD H. PORTER &
ROBERT H. RICE
BY [signature]
[signature]
ATTORNEYS United States Patent Office 3,152,052

Patented Oct. 6, 1964

1

3,152,052

DISTILLATION OF HYDROGEN PEROXIDE

Theodore M. Jenney, Arlington, Mass., and Donald H. Porter and Robert H. Rice, Tonawanda, N.Y., assignors to FMC Corporation, a corporation of Delaware Filed Aug. 4, 1961, Ser. No. 129,389
4 Claims. (Cl. 202—46)

This invention relates to a safe and economical method of concentrating hydrogen peroxide present in an aqueous solution containing carbonaceous impurities, and separating the concentrated hydrogen peroxide in pure form from these impurities.

Hydrogen peroxide is produced by a cyclic process which employs an organic compound, such as 2-ethyl anthraquinone, tert-butyl anthraquinone, isopropyl anthaquinone, or other alkylated anthraquinones. In this process, the alkylated anthraquinone is dissolved in a working solvent, and the solution is passed to a catalytic hydrogenator. During the hydrogenation, the alkylated anthraquinone takes on hydrogen and is converted to an alkylated anthrahydroquinone. The working solvent containing the alkylated anthrahydroquinone is treated in a subsequent oxidation stage, and air or oxygen is reacted with the alkylated anthahydroquinone to yield hydrogen peroxide and to reform the alkylated anthraquinone. The hydrogen peroxide thus produced is separated from the organic solution of alkylated anthraquinone by a water extraction, with the hydrogen peroxide being recovered in the aqueous solution. The organic solution of alkylated anthraquinone is recycled to the hydrogenator, thereby commencing the cycle required to produce hydrogen peroxide. The aqueous hydrogen peroxide which is recovered normally contains about 5 to 35% hydrogen peroxide.

In water extracting the hydrogen peroxide from the organic solution, small amounts of carbonaceous residues unavoidably are carried off in the aqueous solution. Small but significant amounts, on the order of up to 350 p.p.m. of such organics as the solvent, anthraquinone working compound, and degradation products of these compounds, are present in the aqueous hydrogen peroxide extract. This extract is conventionally distilled to increase the hydrogen peroxide concentration and to remove the bulk of the organic impurities.

These organic compounds present several difficulties. They impart an objectionable color to the hydrogen peroxide solution, which diminishes its utility. Also, and very importantly, they create a serious hazard when it is attempted to concentrate the hydrogen peroxide by distillation. Upon heating and rectification of the solution, the water is preferentially vaporized, leaving a residue highly concentrated in hydrogen peroxide, which contains the bulk of the carbonaceous impurities. For example, this concentrated residue will often comprise upwards of 70% of hydrogen peroxide, and on the order of 5,000 to 10,000 p.p.m. or more of carbonaceous impurities.

If it is attempted to add more hydrogen peroxide from the anthraquinone process to the concentrate in the heater without removing the residue therefrom, the added impurities quickly raise the total impurity content of the concentrated hydrogen peroxide solution in the heater above safe levels, that is, above about 10,000 p.p.m. in a solution containing about 60 to 70% or more of hydrogen peroxide. On the other hand, no safe and economical means for recovery of hydrogen peroxide from the concentrated residue is known, and it is not economically feasible to discard this residue, which contains as much as 4 to 30% of the hydrogen peroxide being treated for concentration. For these reasons, complicated and expensive distillation and recovery methods have been resorted to for concentration of hydrogen peroxide derived from the anthraquinone process.

2

It is an object of the present invention to provide a method of concentrating hydrogen peroxide produced by the anthraquinone process, which avoids the conjoint presence of concentrated hydrogen peroxide and a hazardous concentration of carbonaceous impurities.

It is a further object of this invention to provide such a method which operates economically, not requiring an excessive number of steps, or introduction into the system of excessive energy.

It has now been found possible to efficiently concentrate aqueous hydrogen peroxide produced by the anthraquinone process at an original hydrogen peroxide concentration of about 15 to 35% to a concentration of about 50 to 80%, and at the same time safely and economically to remove essentially all of the carbonaceous impurities in the hydrogen peroxide feed, by heating the hydrogen peroxide solution to vaporize the bulk of the water and hydrogen peroxide, continuously withdrawing from the boiling mixture a residue richer in impurities than the feed, in the amount of 2 to 10% by volume of feed volume and containing not more than about 70% of hydrogen peroxide, separating the vapors into steam and aqueous hydrogen peroxide product having a concentration of about 50 to 80%, passing the steam upwardly through the residue richer in impurities to vaporize and remove from the residue all but 1 to 3% of total hydrogen peroxide originally fed to the system, and discarding a final residue containing the bulk of the impurities in the system and the 1 to 3% of hydrogen peroxide at a concentration of up to about 50% of hydrogen peroxide.

In operation of the present process, the feed hydrogen peroxide solution is heated in a purification heater to vaporize the bulk of the solution and provide a mixed vapor of hydrogen peroxide and water, and this vapor is rectified in a first rectifier where it may be concentrated safely to a product containing about 50 to 80% of hydrogen peroxide, while a residue containing not more than 70% of hydrogen peroxide is removed from the bottom of the purification heater in the amount of about 2 to 10% by volume of the solution fed to this heater, and this residue is passed downwardly through a stripper or rectifier column in which steam from the first rectifier is passed upwardly to strip the hydrogen peroxide from the residue and thereby recover it overhead as an aqueous solution. A final residue is purged from the bottom of the stripper and contains most of the impurities in the system, and about 1 to 3% of the hydrogen peroxide initially fed to the system, this hydrogen peroxide being at a concentration of no more than about 50%. The aqueous hydrogen peroxide solution recovered overhead can be recovered as a product, or can be refed to the purification heater with fresh hydrogen peroxide from the anthraquinone process, and recovered from the first rectifier as a concentrated product, for example, containing about 50% to 80% of hydrogen peroxide.

By this means, essentially all of the hydrogen peroxide fed to the concentration system is recovered safely, and carbonaceous impurities do not reach a concentration in the hydrogen peroxide solutions at which they are a hazard. Furthermore, little or no energy, in addition to that employed to operate the purification heater and first rectification column, is required to recover the hydrogen peroxide from the impurity-containing residue purged from the purification heater, since the steam employed for removing the hydrogen peroxide from this residue is waste steam from the first rectification column.

This process will operate with safety, if, as indicated, at least 2 to 10% by volume of the aqueous hydrogen peroxide solution fed to the concentration system, containing about 10 to 35% of the hydrogen peroxide and essentially all of the carbonaceous, or organic, impurities therein, is removed as residue from the purification heater and treated with steam for removal of the hydrogen peroxide. The carbonaceous impurity level in the feed hydrogen peroxide solution can be as high as about 350 p.p.m. and would rapidly rise in concentration in the purification heater to more than about 10,000 p.p.m., a concentration at which they render a concentrated hydrogen peroxide solution extremely hazardous, if the residue were not continuously removed. However, in the present process, organic impurities in the 50 to 70% hydrogen peroxide concentrate in the purification heater are maintained below this hazardous level. Furthermore, subsequent stripping of the hydrogen peroxide from the residue from the purification heater, and purging of a final, or stripped, residue in the amount of about 1 to 3% of the amount of hydrogen peroxide fed, keeps the impurity level in the purge below about 20,000 p.p.m., while at the same time providing a final residue containing not more than about 50% of hydrogen peroxide. This amount of organic impurity, in contact with hydrogen peroxide below 50% in concentration, can be handled safely.

This system is also advantageous in that it permits the residue in the purification heater, comprising organic impurities and hydrogen peroxide, to be purged at high rates. This is due to the subsequent stripping operation during which residual hydrogen peroxide is recovered from the residue before it is discarded as waste. In the absence of a subsequent stripping stage, the purge rate from the purification heater would have to be decreased to prevent loss of excess peroxide with the hydrocarbon impurities. This reduction in the purge rate is objectionable since it results in a potentially dangerous buildup of carbonaceous impurities in the purification heater.

Reference has been made herein to hydrogen peroxide at a concentration of about 50–80%. It will be apparent that the hydrogen peroxide can be concentrated to an even higher level than 80% by further heating and rectification steps. The original concentration and purification removes essentially all of the carbonaceous impurities, so that they no longer present a hazard in the system.

The invention will now be described more fully with reference to the single attached drawing, which represents a distillation and stripping system useful in the present process.

Aqueous hydrogen peroxide 10 derived from the anthraquinone process and containing about 15 to 35% of hydrogen peroxide, and about 350 p.p.m. of carbonaceous impurities, is fed continuously into the middle of purification heater 12 along with recovered hydrogen peroxide 14 from stripper-enricher 16. The aqueous hydrogen peroxide is heated and vaporized in purification heater 12 at a pressure of about 50 to 100 mm. of mercury, and a residue in the amount of about 2 to 10% of the volume of the solution fed to the heater is continuously withdrawn from the bottom of the heater.

The vapor produced in purification heater 12 is continuously passed through line 18 to a point intermediate the ends of the first rectifier 20, and the residue withdrawn from the bottom of the heater, containing about 10 to 35% of the hydrogen peroxide fed to the system, is continuously passed through line 22 to stripper-enricher 16. The concentration of hydrogen peroxide in the residue sent to stripper-enricher 16 is kept below 70%.

The vapors from purification heater 12 are introduced into the middle of the first rectification tower 20, preferably operated at about 30 to 80 mm. of mercury. A primary reboiler 24, preferably operated at about 50 to 100 mm. of mercury, and a source of reflux water 26, are operatively connected to the tower 20. For this operation, aqueous hydrogen peroxide product, having a concentration of about 50 to 80% of hydrogen peroxide, is continuously removed through line 28 from the bottom of rectifier 20, and steam is removed overhead continuously through line 30. The hydrogen peroxide is normally recovered in the amount of about 97 to 99% of the amount fed to the system.

The residue from purification heater 12, moving through line 22, continuously enters stripper-section 32 of stripper-enricher 16 near the top of the stripper-section at 34, and passes downwardly therethrough countercurrently to steam derived from rectification tower 20, and introduced through line 30 continuously to near the bottom of stripper-section 32 at 35. The stripper-section is operated at 30–40 mm. of mercury. Stripper process solution preferably is passed through reboiler 36, normally operated at about 35 to 60 mm. of mercury, in order to improve recovery of hydrogen peroxide from the solution.

A final residue containing hydrogen peroxide in the amount of about 1 to 3% of the weight thereof introduced into the system, and at a concentration of up to about 50%, is removed continuously through line 38 from the bottom of reboiler 36; this residue may contain up to about 20,000 p.p.m. of carbonaceous impurities, that is, on the order of 99% or more of the organic impurities in the system.

The hydrogen peroxide stripped from the process solution in stripper 32 is then passed continuously upwardly into the bottom of enricher or rectification section 40 of the stripper-enricher 16, where it is rectified, preferably at a pressure of about 20 to 45 mm. of mercury, with the aid of reflux water introduced through line 42, at the top of the rectifier. It will be apparent that the rectifier may be positioned above the stripper, as shown in the drawing, or the two may comprise two separate columns, or other like equipment. In either case, hydrogen peroxide is stripped from the residue in the stripper and passed as a vapor into the enricher column where it is rectified for removal of water from the steam with the aid of reflux water.

Excess steam is removed from the system through line 44 at the top of the enricher, and together with excess steam from primary tower 20, via line 46, is discarded. The hydrogen peroxide recovered from enricher 40 is passed continuously from the bottom thereof through line 14 to join with fresh hydrogen peroxide solution with which it is fed into purification heater 12.

The apparatus employed herein should be constructed of glass, stoneware, passivated stainless steel, or the like materials which are resistant to hydrogen peroxide and do not decompose it. Likewise, the water used as a refluxing agent should be free of agents such as metal ions which decompose hydrogen peroxide. Agents such as sodium stannate, dipicolinic acid and the like which are known as stabilizers per hydrogen peroxide, may be added at any point in the system in order to retard decomposition.

In normal operation of the present process, the hydrogen peroxide fed to purification heater 12 is a composite of fresh hydrogen peroxide and hydrogen peroxide recovered from enricher 40. The recovered hydrogen peroxide solution 14 is in the amount of about 10 to 35% of the weight of peroxide 10 introduced into the system, and has a concentration of about 10 to 40% of hydrogen peroxide, so that the concentration of the peroxide fed to purification heater 12 has a concentration about the same as that derived from the anthraquinone process, usually about 15 to 35%. The composite peroxide solution contains less impurities than the peroxide coming from the anthraquinone process, the recycle peroxide having been stripped of much of its impurities.

By way of illustration of the invention, the following example is given of the concentration and purification of hydrogen peroxide derived from the anthraquinone process, and containing about 20% of hydrogen peroxide, in a continuously operating system.

*Example 1*

8080 kg. of 20.2% hydrogen peroxide from the anthraquinone process, and containing 263 p.p.m. of organics, is passed continuously together with 1485 kg. of hydrogen peroxide of the same concentration and containing essentially no organics, recovered from stripper-enricher 16, into a purification heater 12, operated at 40–70 mm. Hg absolute and 35–70° C. 9013 kg. of this solution is continuously removed overhead as a vapor containing about 17.7% of hydrogen peroxide, and passed into the middle of first rectification tower 20. A residual aqueous solution from purification heater 12, in the amount of 552 kg., having a concentration of 62% of hydrogen peroxide and 3840 p.p.m. of carbonaceous impurities, is continuously withdrawn and passed into the top of stripper 32.

The first rectification tower is operated at a pressure of about 50 mm. of Hg absolute, and employs a reboiler maintained at a pressure of about 60 mm. of Hg. Reflux water is passed into the top of the column. Rectification is conducted to permit continuous removal of hydrogen peroxide at a concentration of 70% in the amount of 2270 kg. from the bottom of tower 20, while steam, containing essentially no hydrogen peroxide, is removed continuously through line 30 at the top of this rectification tower. 552 kg. of 62% hydrogen peroxide solution, containing essentially all of the impurities from the original hydrogen peroxide, is passed continuously into the top of stripper 32 which is maintained at a pressure of about 40 mm. of Hg absolute. It is stripped of hydrogen peroxide by steam passed into the stripper at 34 through line 30 from the first rectification tower 20. Reboiler 36, operated at about 45 ml. of Hg absolute, is employed to assist the stripping operation in stripper-enricher 16.

106 kg. of an aqueous solution containing 40% of hydrogen peroxide, and 20,000 p.p.m. of carbonaceous impurities, essentially all of these impurities introduced into the system with the feed, is continuously removed from the bottom of stripper-reboiler 36 through line 38 and discarded as purge, or final residue, material. The stripped hydrogen peroxide vapor and steam are then continuously passed from the top of stripper 32 into the bottom of enricher 40, maintained at a pressure of about 20 mm. of Hg, and in the enricher they are refluxed with water introduced through line 42. As indicated at the beginning of this example, 1485 kg. of 20% aqueous hydrogen peroxide is removed during the period of operation from the bottom of enricher 40, and returned to the hydrogen peroxide feed, line 10, and thence to purification heater 12; during the course of being returned, it is brought to atmospheric pressure.

The steam removed overhead from rectification tower 20, in excess of that employed in the stripper, and the steam removed from enricher 40, are raised to atmospheric pressure and continuously removed from the system. Where desired, the purified water derived from the steam is employed as reflux water, thereby avoiding introduction of extraneous impurities.

It will be seen that it is possible in the present process, economically and in simple equipment, to obtain hydrogen peroxide having a high concentration, and free of harmful amounts of carbonaceous impurities, starting with anthraquinone process hydrogen peroxide containing the usual amount of impurities. Furthermore, it will be seen that little or no heat in addition to that required for rectification is required to recover hydrogen peroxide from the residue material from this initial purification heater, with the result that the over-all recovery of hydrogen peroxide is economical as well as safe. The small amount of heat preferably employed in reboiler 36 does not materially disturb this economic balance.

The invention is applicable to hydrogen peroxide produced by the anthraquinone process employing any of the known working solvents for carrying the working anthraquinone compound, and employing any of the anthraquinone working compounds. Furthermore, it is suitable for treating hydrogen peroxide produced by any of a number of other variations of the anthraquinone process, for example, methods in which the hydrogenation of the anthraquinone is conducted catalytically in the presence of hydrogen with a palladium catalyst, a nickel catalyst, and the like.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. Method of producing from an aqueous solution of hydrogen peroxide containing carbonaceous impurities, an aqueous hydrogen peroxide having a high hydrogen peroxide concentration and free of hazardous amounts of such carbonaceous impurities, comprising heating said aqueous solution of hydrogen peroxide in a vaporizing zone free of phosphoric acid to vaporize the bulk of the water and hydrogen peroxide, continously withdrawing from the boiling mixture in said vaporizing zone a residue stream richer in impurities than the feed in the amount of from 2 to 10% by volume of the feed volume to maintain the carbonaceous impurity level below about 10,000 p.p.m. in said vaporizing zone, said residue stream containing not more than about 70% by weight of hydrogen peroxide, passing the vapors from said vaporizing zone into a distillation zone free of phosphoric acid and distilling said vapors into overhead steam and a residual aqueous hydrogen peroxide product having a concentration of about 50 to 80% by weight, passing said overhead steam upwardly through the entire residue stream in a stripping zone, removing aqueous hydrogen peroxide vapors overhead in said stripping zone and discarding from said stripping zone a final residue which contains the bulk of the carbonaceous impurities in the system and about 1 to 3% by weight of the total hydrogen peroxide originally fed to the system, at a concentration of up to 50% by weight.

2. Method of claim 1 in which the aqueous hydrogen peroxide solution treated is produced by the anthraquinone process.

3. Method of claim 1 in which the hydrogen peroxide removed from the residue by the steam is returned to and vaporized with the hydrogen peroxide fed to the system.

4. Method of claim 2 in which the hydrogen peroxide removed from the residue by the steam is returned to and vaporized with the hydrogen peroxide fed to the system.

References Cited in the file of this patent

UNITED STATES PATENTS

| | | |
|---|---|---|
| 2,520,870 | Wood et al. | Aug. 29, 1950 |
| 2,818,372 | Hood et al. | Dec. 31, 1957 |
| 2,819,949 | Keeler et al. | Jan. 14, 1958 |
| 2,949,343 | Hood et al. | Aug. 16, 1960 |

UNITED STATES PATENT OFFICE

CERTIFICATE OF CORRECTION

Patent No. 3,152,052 October 6, 1964

Theodore M. Jenney et al.

It is hereby certified that error appears in the above numbered patent requiring correction and that the said Letters Patent should read as corrected below.

Column 1, lines 16 and 17, for "anthaquinone" read -- anthraquinone --; line 25, for "anthahydroquinone" read -- anthrahydroquinone --; column 4, line 37, for "steam" read -- stream --; line 53, for "per" read -- for --; column 5, line 33, for "45 ml." read -- 45 mm. --.

Signed and sealed this 2nd day of March 1965.

(SEAL)
Attest:

ERNEST W. SWIDER
Attesting Officer

EDWARD J. BRENNER
Commissioner of Patents